United States Patent [19]
Pollman

[11] 4,419,610
[45] Dec. 6, 1983

[54] REVERSIBLE REGENERATING ELECTRIC VEHICLE DRIVE

[75] Inventor: Frederic W. Pollman, Ames, Iowa

[73] Assignee: Sundstrand Corporation, Rockford, Ill.

[21] Appl. No.: 357,889

[22] Filed: Mar. 15, 1982

[51] Int. Cl.³ .............................................. H07D 3/14
[52] U.S. Cl. .................................... 318/12; 318/139; 318/376; 180/65 E
[58] Field of Search ........................ 318/9, 261, 11–15, 318/376, 134, 432, 433, 139, 282–286, 264–266; 192/8; 180/65 E, 70 R; 74/848, 859

[56] References Cited

U.S. PATENT DOCUMENTS

| | | |
|---|---|---|
| 3,202,234 | 6/1962 | Osborne . |
| 3,332,507 | 7/1967 | Bush .................................... 318/284 |
| 3,704,588 | 12/1972 | Trabbic . |
| 3,858,674 | 1/1975 | Tabor . |
| 3,888,326 | 6/1975 | Osborne . |
| 4,096,418 | 6/1978 | Marumoto et al. . |
| 4,124,812 | 11/1978 | Naito et al. .......................... 318/376 |
| 4,153,128 | 5/1979 | Heitmeyer et al. . |
| 4,365,189 | 12/1982 | Hawkins et al. ..................... 318/284 |

OTHER PUBLICATIONS

"Electric Vehicle CVTs Evaluated" from *Automotive Engineering*, Sep. 1981.

Primary Examiner—J. V. Truhe
Assistant Examiner—A. Evans
Attorney, Agent, or Firm—Wood, Dalton, Phillips, Mason & Rowe

[57] ABSTRACT

A reversible regenerating drive system for a vehicle includes a constant speed, bi-directional motor which is energized by a source of power. The constant speed motor is coupled to a variable ratio transmission which in turn converts the output torque of the motor and delivers it to the vehicle to drive it in either forward or reverse directions at varying speeds. The transmission ratio and the direction of rotation of the motor are determined in accordance with signals derived from a pair of operator demand switches which are used to select the desired torque to be applied to the vehicle. The motor is arranged to generate power back to the source when torque demand is in a direction opposite to rotation of the motor. The direction of rotation of the motor is commanded to follow the direction of torque demand if the output speed of the transmission is below a predetermined value, but remains unchanged when torque direction changes if the output speed of the transmission is above the predetermined value.

8 Claims, 3 Drawing Figures

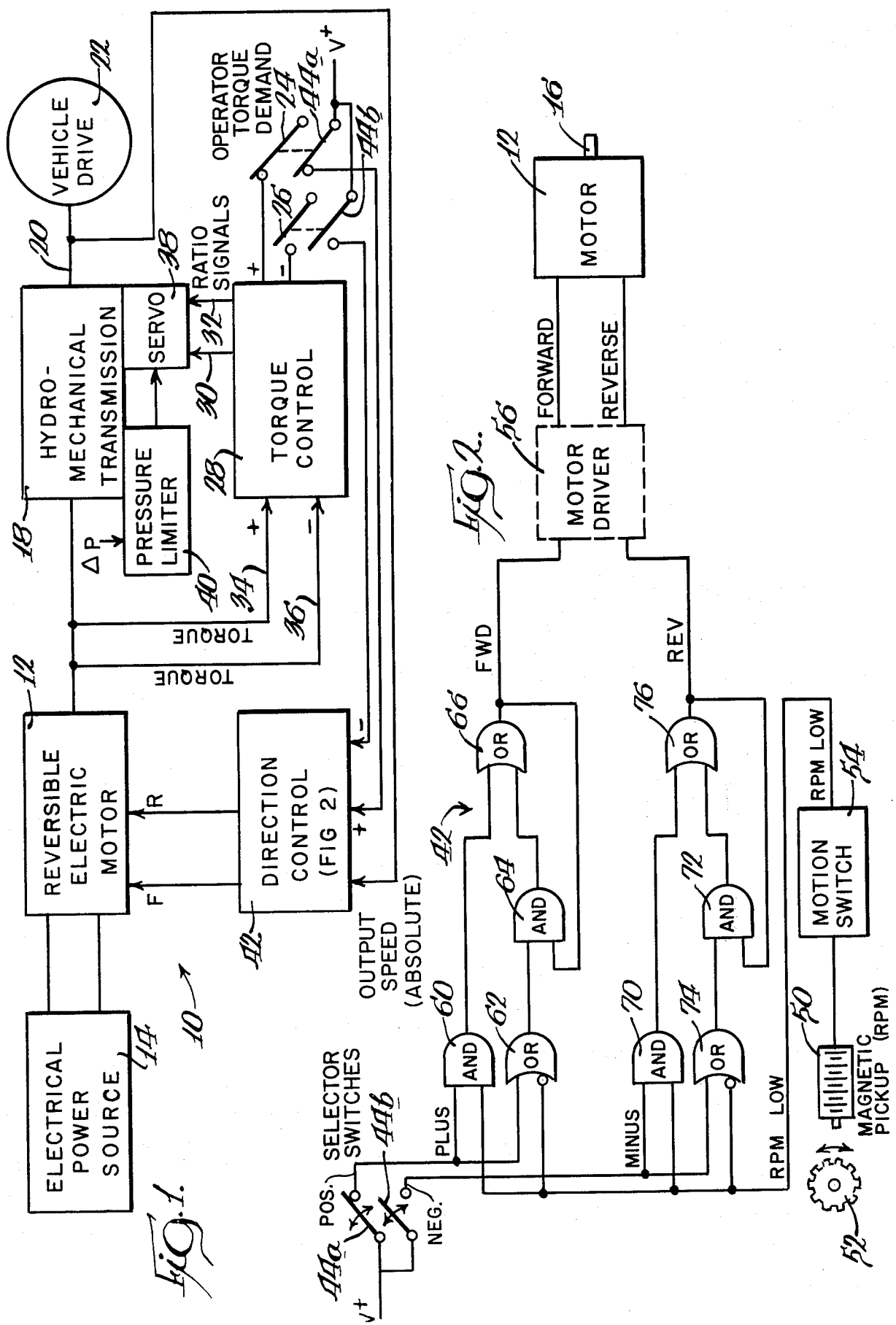

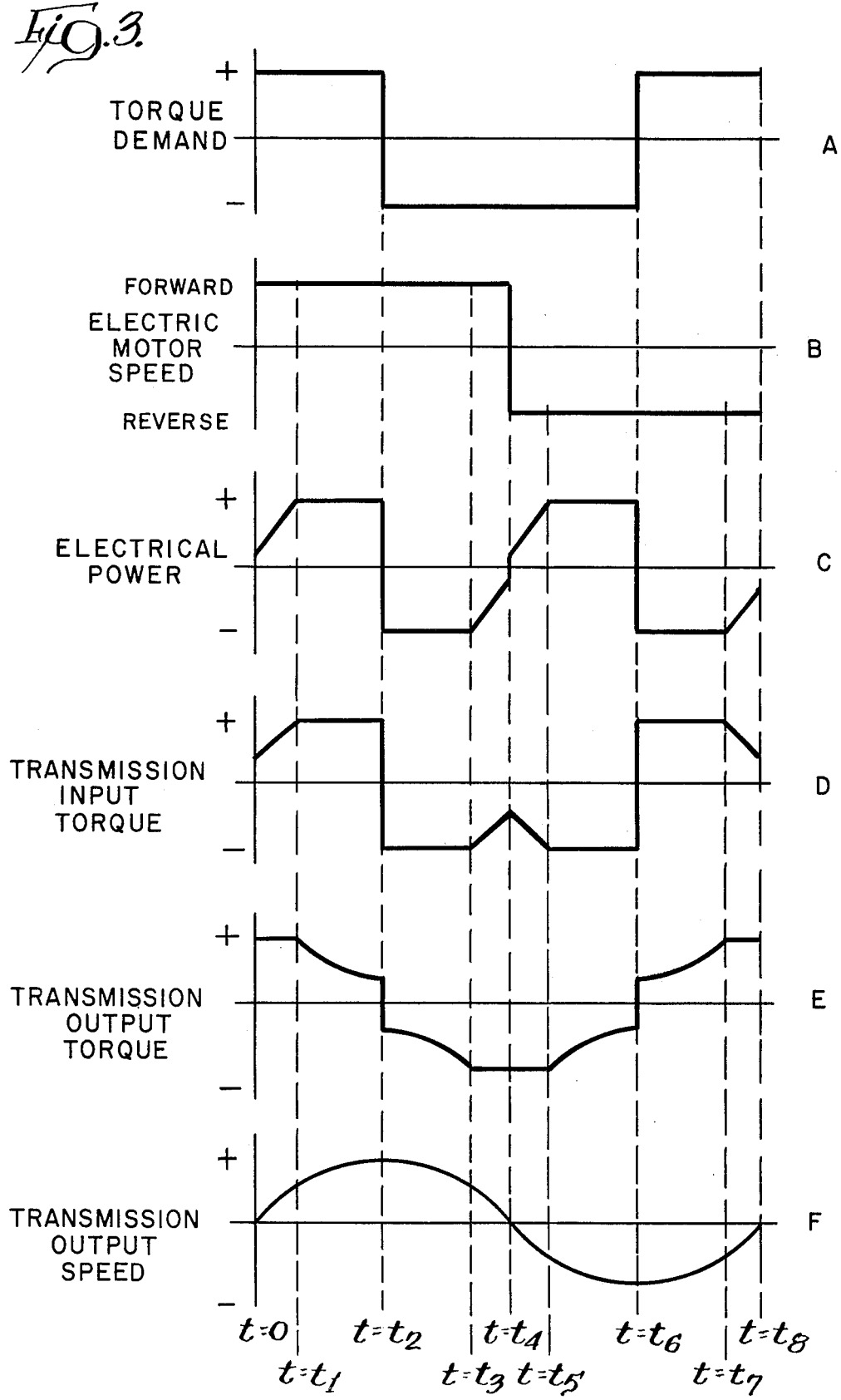

REVERSIBLE REGENERATING ELECTRIC VEHICLE DRIVE

DESCRIPTION

Background of the Invention

This invention relates generally to vehicle drives, and in particular to a reversible regenerating vehicle drive which utilizes a reversible constant speed electric motor.

Due to recent energy shortages, there has been increasing interest in vehicle drive systems which can regenerate power back to the source when the vehicle is braked, and which use energy forms other than petroleum based fuel. One such proposed system involves the use of a battery powered vehicle utilizing a variable speed electric motor which is capable of regenerating power back to the battery.

However, variable speed electric drive motors are expensive. Adding regeneration capability to a variable speed electric motor causes an even further increase in cost.

SUMMARY OF THE INVENTION

In accordance with the present invention, a reversible regenerating vehicle drive system includes a constant speed reversible electric motor which is less costly than a variable speed electric motor. The motor is energized by a power source and is coupled to a variable ratio transmission which converts the output torque of the motor to drive a vehicle at varying speeds.

The motor direction of operation and the ratio of the transmission are controlled in response to signals derived from a pair of operator torque demand switches which allow an operator to drive the vehicle in either a forward or reverse direction at varying speeds.

The motor is capable of operating in a generating mode to feed current back to the power source when torque demand direction is opposite to the direction of rotation of the motor. The motor is commanded to operate in the same direction as the direction of torque demand if the output speed of the transmission is below a predetermined value. The direction of rotation of the motor is unaffected when torque direction changes if the output speed of the transmission is above the predetermined value.

BRIEF DESCRIPTION OF THE DRAWINGS

FIG. 1 is a block diagram illustrating a vehicle drive system according to the present invention;

FIG. 2 is a schematic diagram of a directional control for the motor shown in FIG. 1; and FIG. 3 is a series of waveform diagrams illustrating the operation of the drive system of the present invention.

DESCRIPTION OF THE PREFERRED EMBODIMENT

Referring now to FIG. 1, a regenerative drive system 10 according to the present invention is illustrated.

The drive system 10 includes a prime mover in the form of a reversible or bidirectional constant speed motor 12. In the preferred embodiment, the constant speed motor 12 is of the electric type which is driven by an electrical power source 14, which may be, for example, line current or a battery. The electric motor 12 is also capable of operating in a generating mode to feed electric current back to the power source 14 when the power flow from an output shaft 16, shown in FIG. 2, of the motor 12 is in a negative sense, i.e., when power is delivered to the motor 12 through the shaft 16.

As seen in FIG. 1, the output shaft of the electric motor 12 is coupled to an input of a variable ratio hydromechanical transmission 18 which may have a minimum output speed somewhat greater or less than zero. It should be noted that the transmission 18 must be capable of allowing the electric motor 12 to start up without excessive overload.

The output shaft 15 of the transmission, illustrated schematically by the line 20 in FIG. 1, is coupled to a load which is to be driven at varying speeds in either a forward or reverse direction. In the illustrated embodiment, the load comprises a vehicle drive 22 which is a part of a vehicle (not shown).

Control of the motor 12 and transmission 18 is accomplished by means of a pair of torque operator demand switches 24,26 which are used to select variable amounts of either positive or negative output torque, respectively, from the output 20 of the transmission 18.

In the preferred embodiment, the signals from the output torque demand switches 24,26 are proportional signals which are developed by modulating the flow of pressurized fluid from a pair of torque demand generators (not shown).

The signals from the output torque demand switches 24,26 are coupled to a torque control 28 which develops suitable ratio signals on a pair of lines 30 and 32 to control the ratio of the transmission 18.

For a detailed description of the load control 28, reference may be had to the co-pending application of Pollman et al, Ser. No. 288,988, filed July 31, 1981, entitled "Input Torque Control for a Variable Displacement Hydraulic Transmission", and assigned to the assignee of this application.

In the above co-pending application, the torque control 28 is illustrated as controlling a hydrostatic transmission; however, the torque control as described may be used to control a hydromechanical transmission, such as the transmission 18. Moreover, the co-pending application also discloses a directional control valve which controls the drive direction of the hydrostatic transmission. It should be noted that this directional control valve is omitted in the load control 28 of the present invention.

The torque control 28 also receives as inputs torque signals coupled over a pair of lines 34,36 from the motor 12 representing positive and negative output torques thereof, respectively.

In response to the signals from the torque demand switches 24,26 and the torque signals from the motor on the lines 34,36, the torque control 28 provides hydraulic signals over the lines 30,32 to a servo-valve 38 which in turn controls the displacement of the hydromechanical transmission 18.

During low speed operation of the vehicle drive 22, the output torque of the transmission 18 is limited by a pressure limiter 40, which reduces input torque requirements from the motor 12 at low output speeds and hence facilitates acceleration of the load 22 by the motor 12. For a typical hydromechanical transmission, the value at which transmission output torque is limited is between 4000–6000 psi. The pressure limiter 40 is described in the co-pending application of Pollman et al, Ser. No. 66,499, filed Aug. 14, 1979, entitled "Pressure Override Control", and assigned to the assignee of this application.

Control of the direction of operation of electric motor 12 is accomplished by a directional control circuit 42, which receives as inputs signals generated from a pair of selector switches 44a,44b, which are operatively associated with the torque demand switches 24,26. A third input to the circuit 42 is a signal dependent upon the speed of the output shaft 20 of the hydromechanical transmission 18, as described below.

Referring now to FIG. 2, a schematic diagram of the directional control 42 is illustrated. The directional control 42 commands one of three operation modes of the motor 12, i.e., forward, zero speed or reverse operation, determined partly in accordance with a signal developed by a magnetic pickup 50 which senses the speed in RPM of a toothed gear 52 mounted on the output shaft of the transmission 18. The output of the pickup 50 is coupled to a motor switch 54 which develops a two-state signal (denoted RPM LOW), which is a high state signal when the speed of the rotating gear 52 is below a predetermined switching value, and which is a low state signal when the speed of the rotating gear 52 is above the predetermined switching value. The motion switch 54 may be constructed from standard components, or may be of the type available from Zero-Max Industries, Inc.

Generally, the switching value of the motion switch is set to that point which would allow all practical recovery of vehicle kinetic energy. Theoretically, the switching value could be set equal to zero, but typically might be 0.5 to 1.0 mph vehicle speed for a work vehicle propel function. It should be noted that if the switching value is not equal to zero, then a certain degree of reverse drive capability must be provided by the transmission 18, since the control 42 will reverse the direction of rotation of the motor 12 while the vehicle drive 22 is being driven in the original direction.

The motor control 42 also controls the forward, zero or reverse modes of operation of the motor 12 in response to the positioning of the selector switches 44a,44b. The wipers of the switches 44a,44b are moved in response to movement of the demand switches 24,26 such that a high state signal V+ is coupled to one of two terminals, denoted POS and NEG, depending upon the desired torque demanded by an operator of the vehicle.

For example, as shown in FIGS. 1 and 2, when positive torque is demanded by the operator corresponding to actuation of the switch 24, the wiper of the selector switch 44a contacts the POS terminal.

Alternatively, actuation of the torque demand switch 26, i.e., selection of negative torque to brake a moving vehicle, causes the wiper of the switch 44b to contact the NEG terminal.

When no torque is demanded by the operator, the switches 24 and 26 are not actuated and the signal V+ is not coupled to either of the terminals POS and NEG.

The motor control 42 controls the motor 12 such that the direction of rotation of the motor 12 is commanded to match the direction of torque demand when the output speed of the transmission 18 is below the predetermined value; however, the direction of rotation of the motor 12 remains unchanged, i.e., control of motor direction by the torque demand switches 24,26 is inhibited, when torque demand direction changes if the output speed of the transmission 18 is above the predetermined value.

When no signal is supplied by the switches 44a,44b to the direction control 42, the motor is switched off to decrease parasitic power losses.

With additional circuitry, the directional control 42 could be adapted such that, on a torque demand direction reversal, motor direction of rotation is not switched until the vehicle stops in order to allow the removal of all kinetic energy from the motor. Under this condition, if torque demand reversal occurs when the output speed of the transmission is below the predetermined value, the motor switches off but would resume the same direction of rotation if torque demand is again reversed to the original direction.

Referring specifically to FIG. 2, the directional control 42 develops two signals, denoted FWD and REV, which control the forward and reverse drives of the motor 12, respectively. In practice, only one of these signals controls the motor through a motor driver circuit 56 at any particular time.

The motor driver circuit 56 is constructed from four relay switches (not shown) which control the direction of current into the motor 12, The circuit 56 may also include a motor speed control for driving and braking, if desired.

The circuit for generating the signal FWD can be represented by a logical equation as follows:

$$FWD = (PLUS \cdot RPM\ LOW) + ((PLUS + \overline{RPM\ LOW}) \cdot FWD)$$

where PLUS is a signal having a high state when the wiper of selector switch 44a contacts the POS terminal thereof and where a plus sign indicates the logical AND function and a dot indicates the logical OR function. In other words, the signal FWD will be a high state signal, and hence the motor 12 will be driven in a forward direction, when either the signal PLUS and the signal RPM LOW are both present or when PLUS is present or the signal RPM LOW is not present and the signal FWD is present.

The circuitry for implementing the generation of the control signal FWD includes an AND gate 60 which receives as inputs the signals PLUS and RPM LOW and an OR gate 62 which receives as inputs the signals PLUS and $\overline{RPM\ LOW}$.

The output of the OR gate 62 is coupled to one input of an AND gate 64 which receives as another input the signal FWD. The output of the AND gate 64 is coupled to an OR gate 66 which receives as another input the output of the AND gate 60.

The output of the OR gate 66, i.e., the signal FWD, is coupled to the motor driver circuit 56 to control the motor 12 in the forward direction.

Similarly, the signal REV is generated according to the following equation:

$$REV = (MINUS \cdot RPM\ LOW) + ((MINUS + \overline{RPM\ LOW}) \cdot REV)$$

where MINUS is a signal having a high state when the wiper of the selector switch 44b contacts the NEG terminal thereof.

In a fashion similar to the circuit for generating the signal FWD, the circuit for generating the signal REV includes AND gates 70,72 and OR gates 74,76, with the output of the OR gate 76, i.e., the signal REV, being coupled to the motor driver circuit 56 to control the motor 12 in the reverse direction.

The signal REV is generated only when the wiper 44b of the selector switch 44 is coupled to the NEG terminal thereof and when the signal RPM LOW is present or when the signal MINUS is present or the signal RPM LOW is not present and the signal REV is present.

When neither of the wipers of the selector switches 44a, 44b contacts the POS and NEG terminals, the circuitry for generating the signals FWD and REV is disabled and hence the motor is de-energized. The control 42 is arranged so as to stop the electric motor in the generating mode so as to deliver electric power to the electrical power source 14 and thereby conserve the kinetic energy in the rotating parts.

Referring now to FIG. 3, there is shown a series of waveform diagrams, denoted A-F, illustrating the operation of the present invention. The waveforms of FIG. 3 are shown for the case when the predetermined switching value of the motion switch 54 is equal to zero.

In each of the waveform diagrams except diagram C representing electrical power, positive excursions denote torque or speed in the forward direction while negative excursions denote torque or speed in the reverse direction. Positive values in diagram C represent power flow from the power source 14 to the motor 12, while negative values represent power delivered to the power source 14 from the motor 12 operating in the generating mode.

Assume that a time $t=0$, a vehicle (not shown) incorporating the present invention and having a vehicle drive 22 is starting from rest and that positive torque is demanded by an operator actuating the switch 24.

When the torque demand switch 24 is actuated, the wiper of the selector switch 44a is moved to the POS terminal and a high state signal is coupled thereto which is in turn coupled to the AND gate 60 and the OR gate 62. Since the speed of the transmission output is zero, a high state signal is generated by the AND gate 60 and hence the signal FWD is generated and is coupled to the motor driver 56 to command the motor 12 to operate in the forward direction. It should be noted that due to the inertia of the moving parts of the motor, there will be some delay between the generation of a command for the motor and the actual implementation of the command thereby.

At time $t=0$, the transmission input torque, and hence the electrical power delivered to the motor 12 rise abruptly to a value greater than zero, such rise being due to the necessary input power required to start the motor.

As seen in FIG. 3, between time $t=0$ and $t=t_1$, transmission output torque is limited by the pressure limiter 40 to a constant value. During this interval, the electrical power delivered to the motor 12 by the power source 14 gradually increases to the maximum rating of the motor 12. Also, the transmission input torque rises linearly to the maximum input torque for the transmission 18.

During this time, transmission output speed, and hence vehicle drive speed increases in the forward direction. At time $t=t_1$, the transmission output torque begins to decrease from the limiting value in response to the increase in transmission output speed.

Between time $t=t_1$ and $t=t_2$, electrical power and transmission input torque remain constant since the transmission output torque is no longer limited, and in fact follows a constant power curve for the transmission 18.

At time $t=t_2$, the transmission output speed has reached a maximum, and hence the vehicle is being driven at the maximum forward speed.

Assume that at $t=t_2$, the operator demands a constant negative torque or braking action to slow down the vehicle. Since the transmission output speed at this time is high, i.e., above the predetermined value as determined by the motion switch 54 shown in FIG. 2, the direction of motor rotation continues in the forward direction even though the wiper of the selector switch 44b is coupled to the terminal NEG. However, since negative torque is demanded by the operator by appropriately positioning the switches 24, 26, in turn causing the torque control 28, FIG. 1, to change the ratio of the transmission 18, the vehicle drive 22 and the transmission 18 are in effect driving the motor 12. This driving of the motor 12 is depicted by the negative excursions of the graphs representing transmission input torque and transmission output torque.

The driving of the motor 12 by the transmission 18 in turn causes the motor 12 to generate power which is delivered back to the power source 14. This action is depicted by the graph representing electrical power which abruptly becomes negative at time $t=t_2$.

Between time $t=t_2$ and $t=t_3$, the transmission output torque gradually increases in the negative direction resulting in a reduction in the speed at the transmission output. During this time, the transmission output torque follows a constant negative power curve, and hence the electrical power and the transmission input torque remain constant. Moreover, since the transmission output speed was above the predetermined value (i.e., zero) at the time negative torque was demanded, the motor 12 continues to operate in the forward direction.

At time $t=t_3$, the transmission output torque reaches the negative limiting value and remains constant thereafter. Between $t=t_3$ and $t=t_4$, transmission input torque and electrical power increase in the positive direction as the transmission output speed decreases towards zero.

At time $t=t_4$, the transmission output speed reaches zero. At this time, the motion switch 54 generates the signal RPM LOW which is then coupled to the AND gate 70 and the OR gate 74, shown in FIG. 2. Since the signal MINUS is already present, the signal REV is generated and is coupled to the motor driver circuit 56 to drive the motor 12 in the reverse direction. As before noted, there will be some delay before the motor actually begins to drive in the reverse direction.

Between time $t=t_4$ and $t=t_5$, transmission output speed gradually increases in the negative direction; however, transmission output torque is limited by the action of pressure limiter 40, and hence transmission input torque increases linearly in the negative direction. Since the motor 12 is now driving the transmission 18 in the reverse direction, electrical power abruptly changes to a positive value and increases linearly until time $t=t_5$, indicating that power is being delivered to the motor 12 to drive the transmission 18.

Between time $t=t_5$ and $t=t_6$, the transmission output torque begins to increase in the positive direction and follows a constant power curve, resulting in electrical power and transmission input torque remaining constant during this interval. During this time, the transmission output speed gradually increases to its maximum negative value.

At time $t=t_6$, the transmission output speed is at a maximum in the reverse direction. If the operator then demands positive torque, the motor 12 will continue to be operated in the reverse direction, thereby delivering power back to the source 14, as indicated by the negative excursion of the graph representing electrical power.

At time $t=t_6$, the torque control 28 instructs the transmission 18 to deliver positive, i.e., forward transmission output torque to the vehicle drive 22. At this time, transmission input torque also becomes negative.

Between time $t=t_6$ and $t=t_7$, electrical power and transmission input torque remain constant as the transmission output torque follows a constant power curve. At time $t=t_7$, the transmission output torque is limited by the action of pressure limiter 40, shown in FIG. 1, and hence transmission input torque begins to decrease while electrical power increases in the positive direction.

Between time $t=t_7$ and $t=t_8$, transmission output speed gradually increases to zero as electrical power increases in the positive direction and transmission input torque decreases.

As previously noted, if torque demand reverses while the transmission output speed is below the predetermined value, then electric motor speed immediately reverses upon reversal of the torque demand.

I claim:

1. A regenerative drive system for driving a load at varying speeds in a forward or reverse direction comprising:
   a variable ratio transmission having an input and an output shaft coupled so as to be capable of driving the load;
   a constant speed bi-directional electric motor having an output coupled to the input of the transmission;
   a source of power for energizing the motor;
   means for generating a torque demand signal representing a torque to be developed by the transmission to control the direction of the motor;
   means for generating in response to the torque demand signal generating means a motor direction command signal; and
   means for controlling the direction of operation of the motor in response to the motor direction command signal when the speed of the output shaft of the transmission is less than a predetermined value.

2. The regenerative drive system of claim 1, further including means for sensing the speed of the load and means for inhibiting the motor direction control means if the speed of the load is greater than a predetermined value.

3. The regenerative drive system of claim 1, wherein the motor direction control means includes means for energizing the motor in the forward direction, means for energizing the motor in the reverse direction, and means for coupling a signal to either the forward direction energizing means or the reverse direction energizing means to energize the motor in one of said directions.

4. The regenerative drive system of claim 2, wherein the motor direction control means includes means for generating a signal dependent upon the speed of the output shaft of the transmission.

5. The regenerative drive system of claim 4, wherein the means for sensing includes a magnetic pickup and a gear disposed on the output shaft of the transmission.

6. The regenerative drive system of claim 5, wherein the means for inhibiting includes a motion switch coupled to the magnetic pickup.

7. A regenerative drive system for driving a load, comprising:
   a bi-directional constant speed motor energizable by a source of power so as to be driven either in a first direction or in a second direction opposite to the first direction to develop output torque in either of said directions;
   means coupled to the motor for converting and delivering the output torque of the motor to the load so that the load is driven in either the first or second direction at an output speed;
   means for generating a torque demand signal having a range of values representing a desired torque to be delivered to the load in either direction;
   means responsive to the torque demand signal generating means and the output speed of the converting means for controlling the direction in which the motor is driven, said motor delivering power to the power source when the desired torque to be delivered to the load is in a direction opposite to the direction the motor is driven.

8. A regenerative drive system for driving a vehicle having a vehicle drive, comprising:
   a bi-directional constant speed electric motor energizable by a source of power so as to be driven in a first direction or in a second direction opposite to the first direction and to develop output torque in either of said directions;
   a hydromechanical transmission having a variable ratio coupled to the motor for converting and delivering the output torque thereof to the vehicle drive so that the vehicle is driven in either the first or second direction;
   means for developing a torque demand signal representing a desired torque to be delivered to the vehicle drive;
   a torque control for controlling the variable ratio of the transmission in response to the torque demand signal and the output torque of the motor;
   means for selecting a desired direction of torque to be applied to the vehicle; and
   means responsive to the desired torque direction selecting means for controlling the direction in which the motor is driven, said motor delivering power to the sorce of power when the direction in which the motor is driven is opposite to the desired direction of torque to be applied to the vehicle.

* * * * *

UNITED STATES PATENT AND TRADEMARK OFFICE
CERTIFICATE OF CORRECTION

PATENT NO. : 4,419,610

DATED : December 6, 1983

INVENTOR(S) : Frederic W. Pollman

It is certified that error appears in the above-identified patent and that said Letters Patent is hereby corrected as shown below:

Column 7, line 8, delete "negative" and substitute therefor --positive--.

Signed and Sealed this

Twenty-third Day of July 1985

[SEAL]

Attest:

DONALD J. QUIGG

Attesting Officer     Acting Commissioner of Patents and Trademarks